United States Patent [19]

Mitcham

[11] Patent Number: 5,537,315
[45] Date of Patent: Jul. 16, 1996

[54] METHOD AND APPARATUS FOR ISSUING INSURANCE FROM KIOSK

[76] Inventor: Martin K. Mitcham, 11 Bunker Hill, Richardson, Tex. 75080

[21] Appl. No.: 216,667

[22] Filed: Mar. 23, 1994

[51] Int. Cl.⁶ .................................................. G06F 17/60
[52] U.S. Cl. .................................. 364/408; 364/DIG. 1; 364/DIG. 2; 364/918; 364/918.5; 364/225; 364/227.3
[58] Field of Search ................... 364/DIG. 1 MS File, 364/DIG. 2 MS File, 400, 401, 406, 407, 408; 395/100, 101, 104, 118, 129, 144, 145, 146, 147, 148, 149, 153, 154, 155, 156, 157, 158, 159, 150, 161, 600

[56] References Cited

U.S. PATENT DOCUMENTS

| | | | |
|---|---|---|---|
| 4,648,037 | 3/1987 | Valentino | 364/408 |
| 5,049,862 | 9/1991 | Dao et al. | 340/706 |
| 5,297,202 | 3/1994 | Kapp et al. | 380/9 |

*Primary Examiner*—Robert B. Harrell
*Attorney, Agent, or Firm*—Harris, Tucker & Hardin

[57] ABSTRACT

A method and system in a data processing system for automatically associating a user's signature with a document. The data processing system includes a touchscreen display, a central processing unit, a data storage system, at least one document stored within the data storage system, and a pointing device. A document is specified within the data processing system. A signature is received in response to the user touching the touchscreen utilizing the pointing device. A signed document is then created by automatically associating the signature with the document.

7 Claims, 21 Drawing Sheets

INFORMATION REVIEW

```
      Zip code of driver : 75080
         Number of drivers: 1
         Number of Cars : 1
   Driver:           1
         age : 33
         sex : Male
       status : Single
      #ticket : 0
     #accident : 0
         Car:            1
         year : 93
       driven : WORK
        make : CHEV
        model : BERETTA GT
```

IF ANY CHANGE ?

[MAIN] [ZIP] [AGE] [CARS]   [RATE]
[TICKES] [MAKES] [MODELS]

DRIVER # 1

OF TICKETS IN THE LAST 3 YRS? _

| 0 | 1 | 2 | 3 | 4 |
| 5 | 6 | 7 | 8 | 9 |

DRIVER # 1

OF ACCIDENTS IN LAST 3 YEARS ? _

| 0 | 1 | 2 | 3 | 4 |
| 5 | 6 | 7 | 8 | 9 |

CAR # 1  CHEV

| ASTRO | BEL AIR | BERETTA |
| BERETTA GT | BERETTA GTU | BERETTA GTZ |
| BISCAYNE | CAMARO | CAMARO |
| CAMARO | CAPRICE | CAPRICE |
| CAVALIER | CAVALIER CON | CAVALIER RS |
| CAVALIER Z24 | CELEBRITY | CHEVELLE |
| CHEVETTE | CHEVY II | CITATION |

```
            INFORMATION REVIEW

Zip code of driver : 75080
       Number of drivers : 1
        Number of Cars : 1
   Driver :           1
          age : 33
          sex : Male
       status : Single
      #ticket :  0
     #accident :  0
          Car :          1
         year : 93
       driven : WORK
         make : CHEV
        model : BERETTA GT

IF ANY CHANGE ?
```

[MAIN] [ZIP] [AGE] [CARS]    [RATE]
[TICKES] [MAKES] [MODELS]

YOU HAVE COMPLETED THE APPLICATION PROCESS

IF YOU WOULD LIKE TO REVIEW YOUR APPLICATION BEFORE SIGNING, PLEASE PRESS HERE

REVIEW

IF YOU ARE READY TO START YOUR COVERAGE.......

USE THE WAND PROVIDED AND SIGN BELOW

APPLICANT'S STATEMENT: I HAVE READ THE PRECEEDING APPLICATION AND I DECLARE THAT TO THE BEST OF MY KNOWLEDGE AND BELIEF, ALL OF THE FOREGOING STATEMENTS ARE TRUE AND CORRECT.

APPLICANT'S SIGNATURE

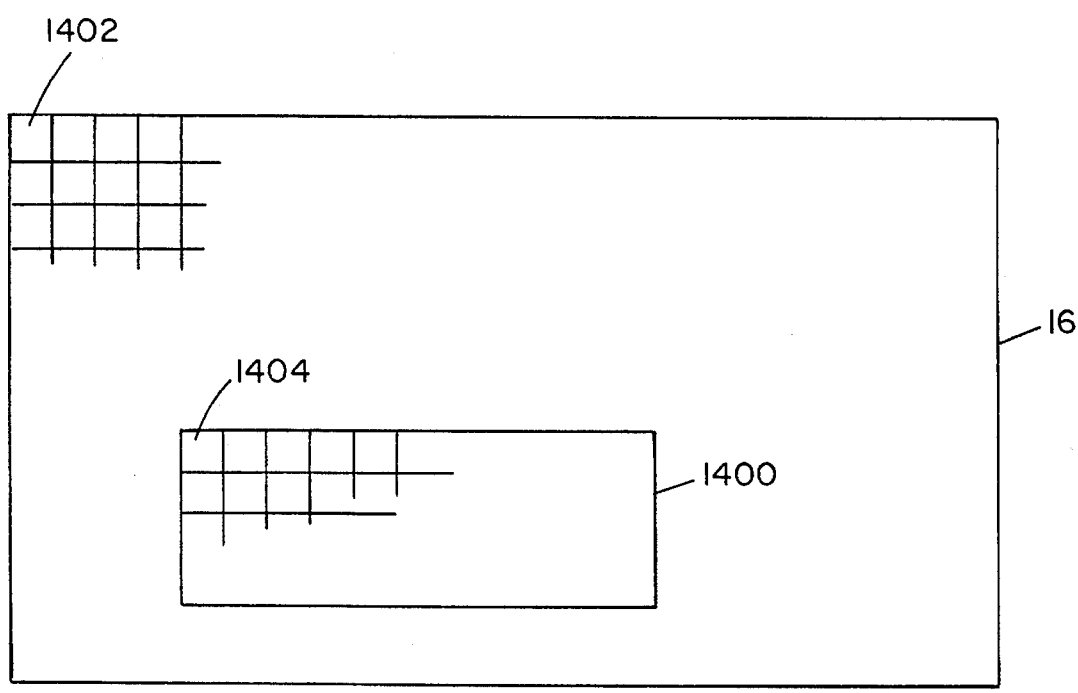

METHOD AND APPARATUS FOR ISSUING INSURANCE FROM KIOSK

BACKGROUND OF THE INVENTION

1. Technical Field

The present invention relates in general to data processing systems and in particular to a method and system within a data processing system for automatically associating a user's signature with a document stored within the data processing system. Still more particularly, the present invention relates to a method and system within a data processing system for creating a signed document by receiving a signature in response to a user touching a touchscreen utilizing a pointing device and automatically associating the signature with a specified document.

2. Description of the Related Art

Interactive multimedia kiosks are well known in the art. These kiosks are often used as directories of tenants in office buildings or shopping malls, or as automatic teller machines at banks to permit customers to make withdrawals, deposits, fund transfers, or balance inquiries.

These systems typically include a printer, a credit card reader, and a personal computer having a display screen, data storage device, modem, and an interactive media device such as a CD-ROM. Often the computer display screen is a touchscreen display. Touchscreen displays are displays that may permit interaction between the user and the personal computer by receiving user inputs in response to a user touching the screen with an object, such as the user's finger or a pointing device.

A pointing device may include a person's finger, light pen, sonic pen, voltage pencil, stick, or wand. Some intelligent pointing devices, such as light pens, sonic pens, or voltage pens use specialized electronics included within the pen itself in order to determine the location of the pen when it is used with a display screen. For example, a light pen may include a photo cell within the pen itself. When the photo cell is placed on the display at a particular X-Y position within the display, a light beam sweeps across the screen enabling the light pen to determine its X-Y coordinates.

In other known systems, any type of pointing device may be utilized. For example, in some touchscreens a user may select a particular location within the display simply by applying pressure to the selected location. These touchscreens respond to that pressure and are able to determine the X-Y coordinates of the location where the pressure was applied. Any type of pointing device may be used with these touchscreens, such as a user's finger, an ordinary pencil, stick, or wand.

It is known in some data processing systems to permit entry of a user's signature utilizing a digitizing pad and stylus. In these systems, when the stylus senses that it has been touched to the pad at a particular location, the pad then determines the X-Y coordinates of the location.

Personal digital assistants are also known in the art. Some of these devices may be trained to recognize a user's signature by having the user repeatedly "sign" a pad. These devices receive the "signature" through intelligent pointing devices such as a light pen.

It is known in the insurance industry for a representative of an insurance company to create an insurance agreement or policy based on information obtained from a prospective insured. An insurance rate is calculated based on the information the prospective insured provides, in addition to the level of coverage the individual desires.

For example, if an individual wishes to obtain automobile insurance, the individual may be required to provide to the company the number of traffic tickets, traffic accidents, and age of the individual. The insured may then select a particular level of coverage. A rate may be calculated based on this information.

Once the prospective insured pays the company, the company issues a binder. The binder is evidence of the insurance policy. The insurance policy is then sent to the insured at a later time. The insured is covered by the insurance at the selected level as of the time the binder is issued.

SUMMARY OF THE INVENTION

It is therefore one object of the present invention to provide an improved data processing system.

It is another object of the present invention to provide a method and system within a data processing system for automatically associating a user's signature with a document stored within the data processing system.

It is yet another object of the present invention to provide a method and system within a data processing system for creating a signed document by receiving a signature in response to user touching a touchscreen utilizing a pointing device and automatically associating the signature with a specified document.

The foregoing objects are achieved as is now described. A method and system are disclosed in a data processing system for automatically associating a user's signature with a document. The data processing system includes a touchscreen display, a central processing unit, a data storage system, at least one document stored within the data storage system, and a pointing device. A document is specified within the data processing system. A signature is received in response to the user touching the touchscreen utilizing the pointing device. A signed document is then created by automatically associating the signature with the document.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

3

Figure 4:
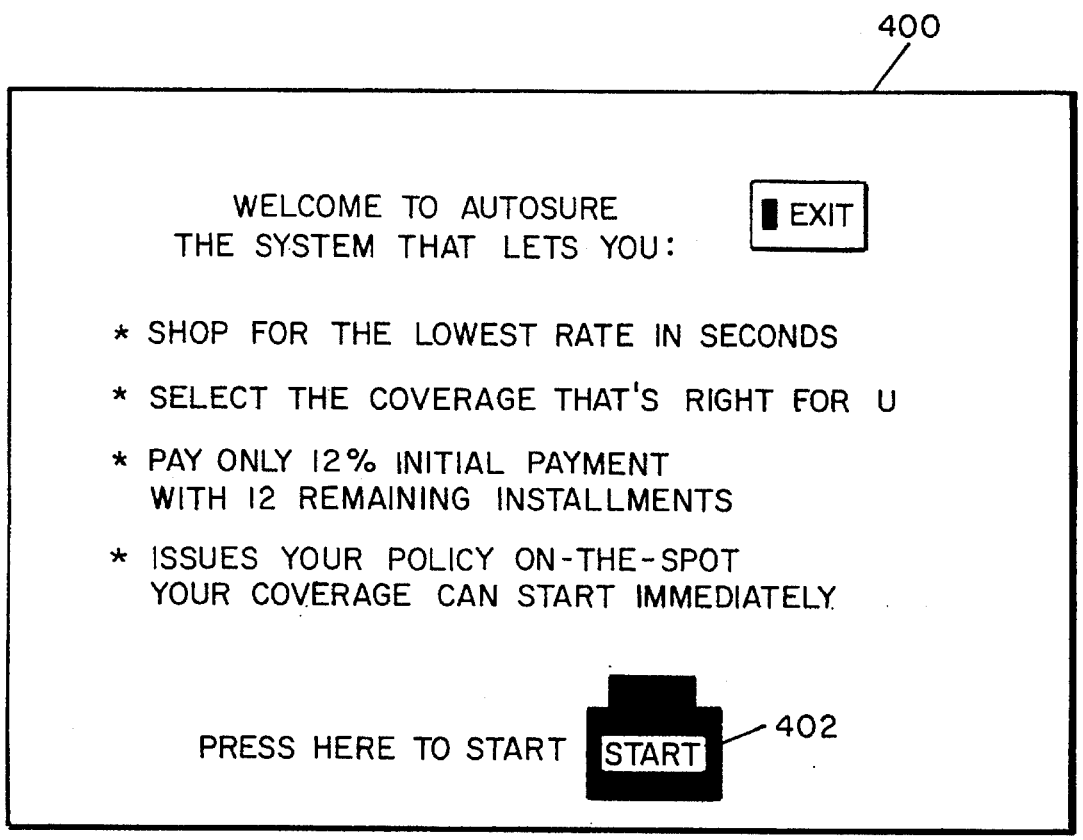
Figure 5:
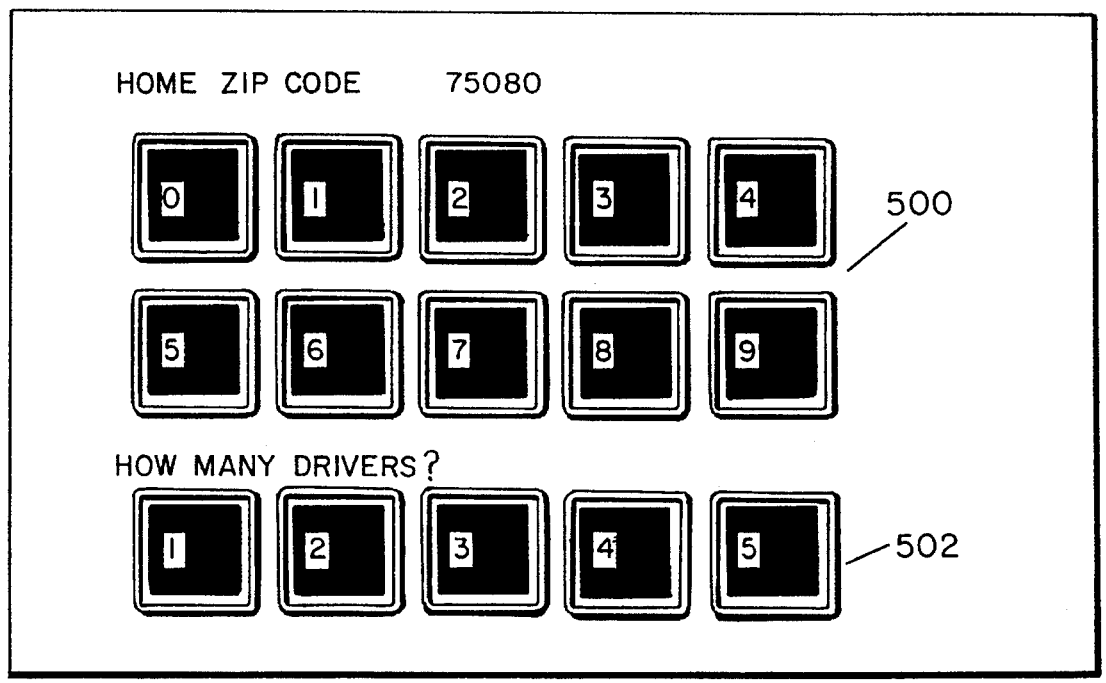
Figure 6:
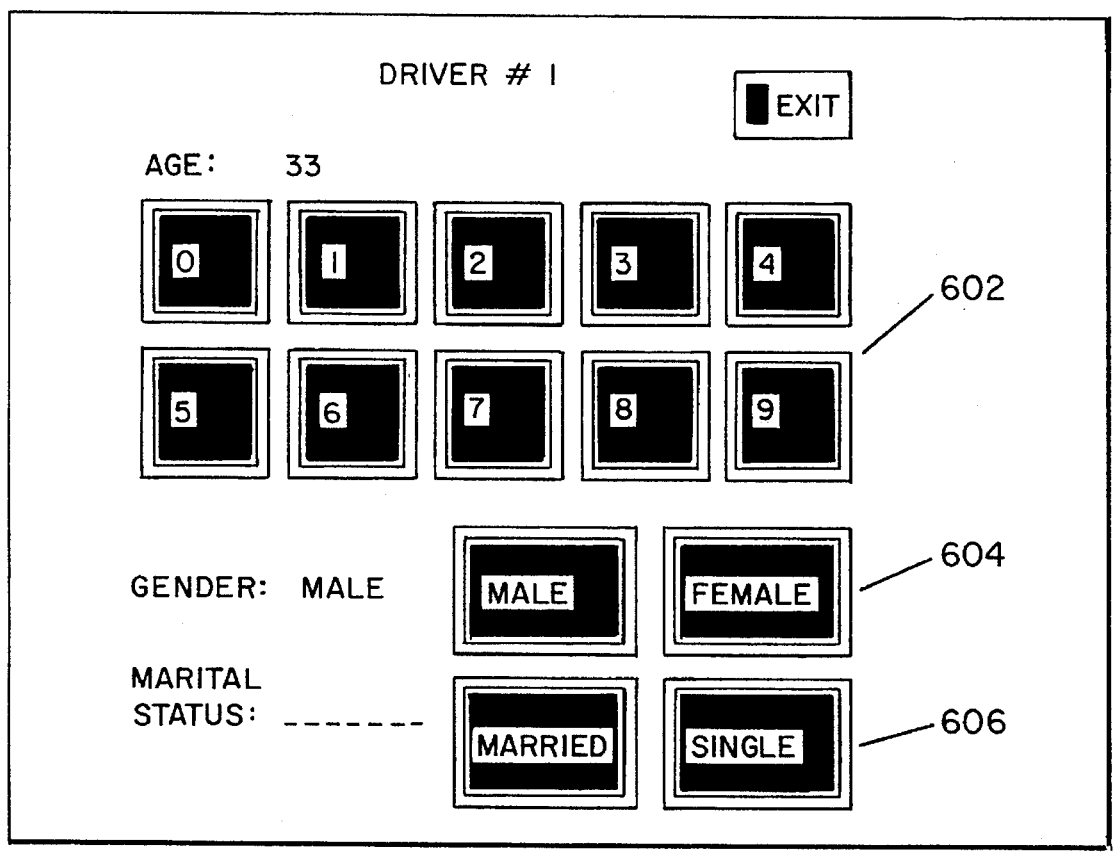
Figure 13:
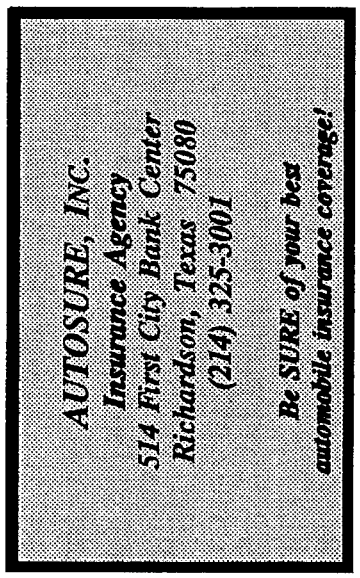

FIG. 4 is a pictorial representation of computer display screen depicting an introductory screen in accordance with the present invention;

FIGS. 5,6,7,8,9,10 and 11 are pictorial representations of computer display screens in accordance with the present invention depicting entry screens whereby a use may enter data such as zip code, number of drivers, age, gender, marital status, number of tickets, number of accidents, number of cars, and the year, make, and model of the cars including the manner in which the car is driven;

FIG. 12 is a pictorial representation of a computer display screen depicting a summary screen of the data the user has entered in accordance with the present invention;

FIG. 13 is a pictorial representation of a computer display screen depicting the lowest rates for each level of coverage and including a summary of the data entered by the user in accordance with the present invention;

FIG. 14A is a pictorial representation of a computer display screen depicting a signature window in accordance with the present invention; and FIG. 14B is a pictorial representation of a computer display screen depicting a portion of the pixels within touchscreen 16 and a signature window in accordance with the present invention.

DETAILED DESCRIPTION OF PREFERRED EMBODIMENT

Figure 1:
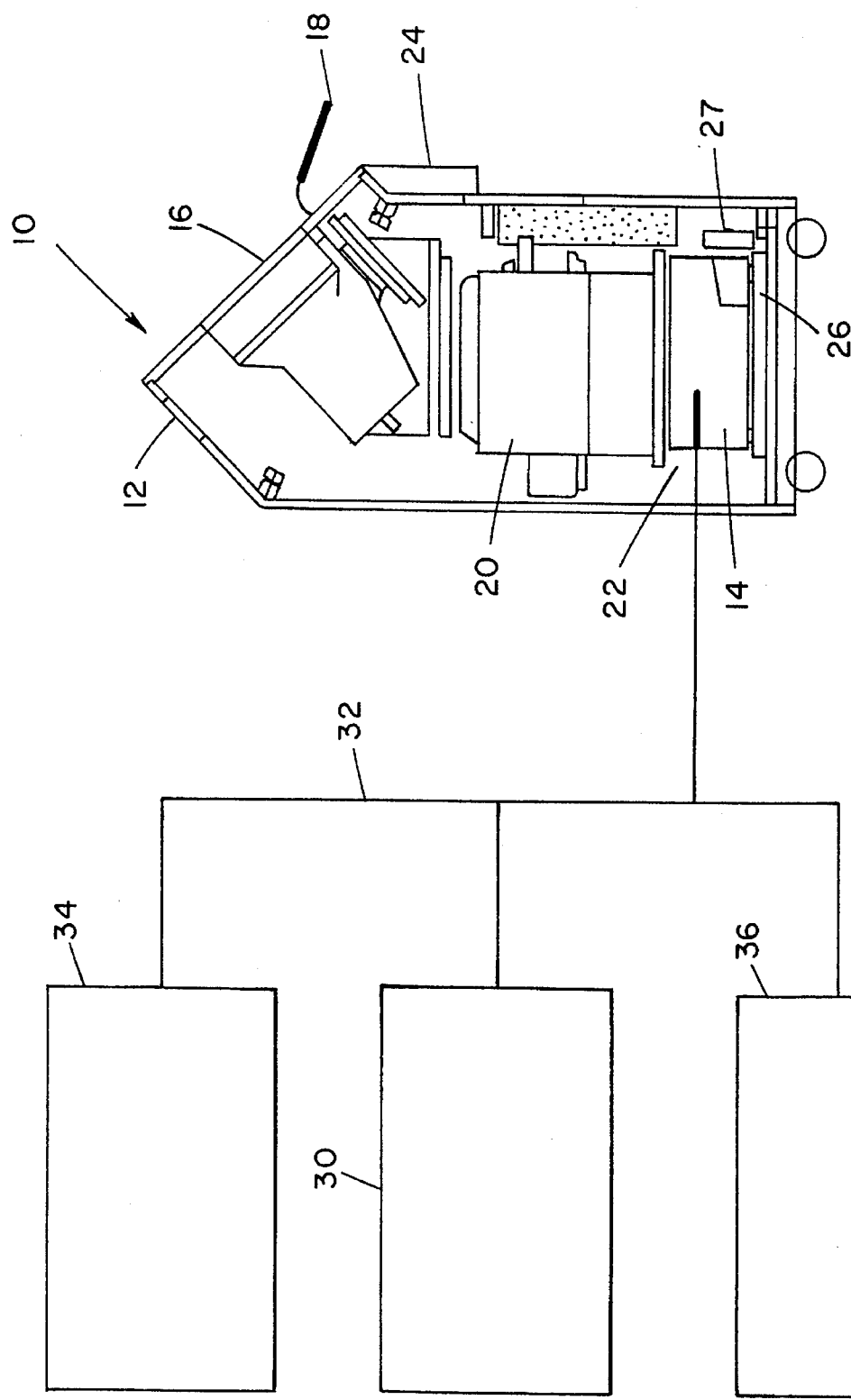
FIG. 1 is a high level block diagram depicting a data processing system which may be utilized to implement the method and system of the present invention.

With reference now to the figures and in particular with reference to FIG. 1, there is depicted a data processing system 10 such as an interactive multimedia kiosk 12 which may be utilized to implement the method and system of the present invention. Kiosk 12 includes a computer 14, touchscreen 16, a pointing device 18, a printer 20, modem 22, a credit card entry system 24, a data storage system 26, and a keyboard 27. Those skilled in the art will appreciate that a number of other peripherals may also be provided such as speakers and a CD-ROM device.

Computer 14 may be any suitably configured personal computer. One such example is the Victor Model 200 SX/25, provided by Tandy Corporation, Fort Worth, Texas which may include a data storage system 26, modem 22, and keyboard 27. An example of a suitable touchscreen for use as touchscreen 16 is that provided by Hi-Tech Instruments, Inc. Sugarland, Tex. An example of a suitable printer for use as printer 20 is a laser printer model 4L provided by Hewlett Packard Company, Boise, Ida. An example of a suitable credit card entry system for use as credit card entry system 24 is model 102 provided by American Microsystems, Euless, Tex.

Data processing system 10 may be linked electronically to a data processing system 30 via link 32 so that data processing system 10 may communicate with data processing system 30 as known in the art. Link 32 may also link other data processing systems such as data processing system 34 which, for example, might be located at the office of an insurance company, and data processing system 36 which might be located at a governmental office such as the department of motor vehicles.

In accordance with the present invention, a user may supply information to data processing system 10 by utilizing touchscreen 16 and pointing device 18. Those skilled in the art will recognize that a user may use his or her own finger as pointing device 18. This information may be utilized to create a document such as an insurance agreement. This document may be in a traditional hardcopy form printed on paper by printer 20, or it may be kept as an electronic document stored, for example, in data storage system 26.

In addition, by utilization of link 32, data processing system 10 may interact with data processing systems 30, 34, and 36. Various reports may be ordered via link 32 from data processing system 36 such as a driving history including number and types of accidents for a specified driver.

By utilizing kiosk 12, a user may independently create a binding agreement, such as an insurance agreement, without the need for interacting with a representative of the other party, such as a representative of an insurance company. Kiosk 12 prompts the user to enter the information required in order to calculate an insurance rate. Once this information has been entered, a rate may be calculated for differing levels of coverage. Any known method of rate calculation may be utilized. Any number of insurance companies or agents may supply rates to kiosk 12. A determination is made of the identity of the company or agent providing the lowest rate for a particular level of coverage. In this manner, the lowest rate available from the insurance companies and agents is provided to the user.

A user may then receive a binder upon the selection of a particular level of coverage if the user selects to pay for the insurance with a credit card. A signature screen (see FIG. 14) is displayed. The user may then sign the screen using any type of pointing device.

It should be apparent that any type of agreement may be generated using kiosk 12. Such agreements may include automobile insurance agreements, life or home insurance agreements, rental car agreements, or any type of contract.

Figure 2:
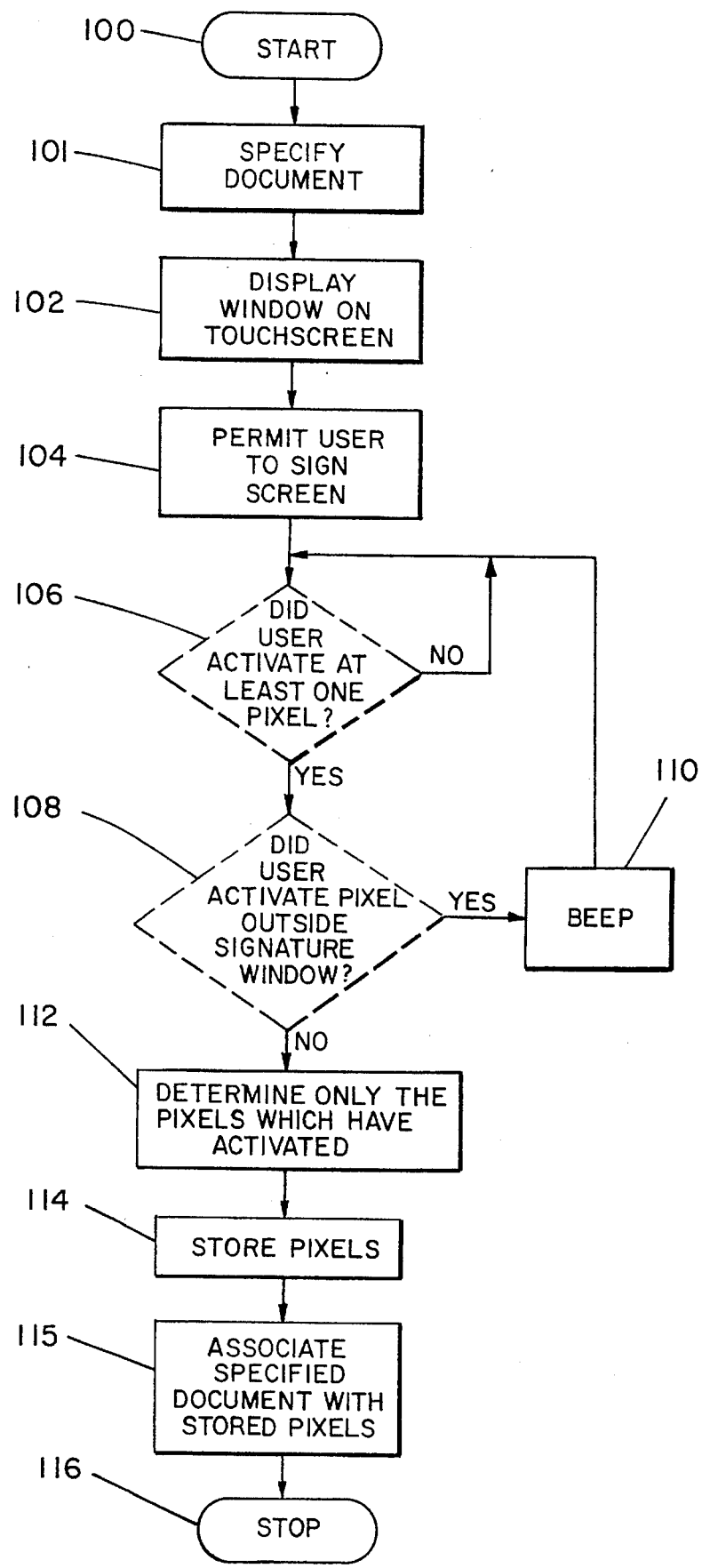
FIG. 2 is a high level flow chart which depicts the automatic association of a user's signature with a selected document within the data processing system of FIG. 1 in accordance with the present invention.
Figure 3A:
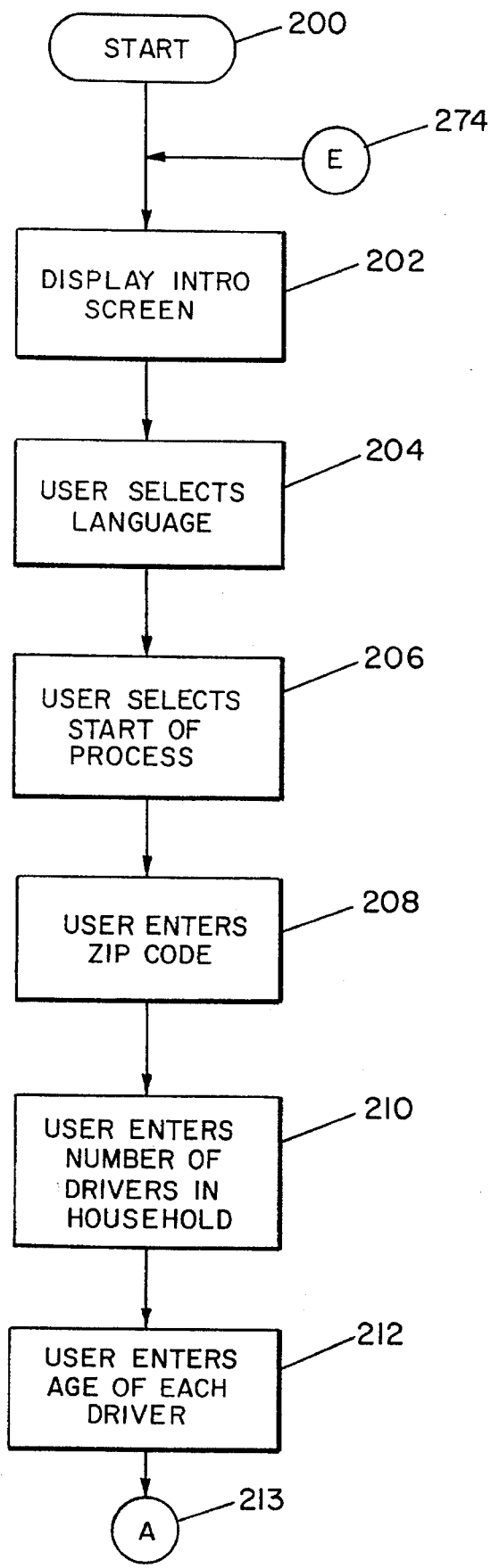
FIGS. 3A, 3B, 3C, 3D, 3E, 3F, and 3G together form a high level flow chart which depicts the automatic creation of a binding insurance agreement within the data processing system of FIG. 1 in accordance with the present invention.
Figure 3B:
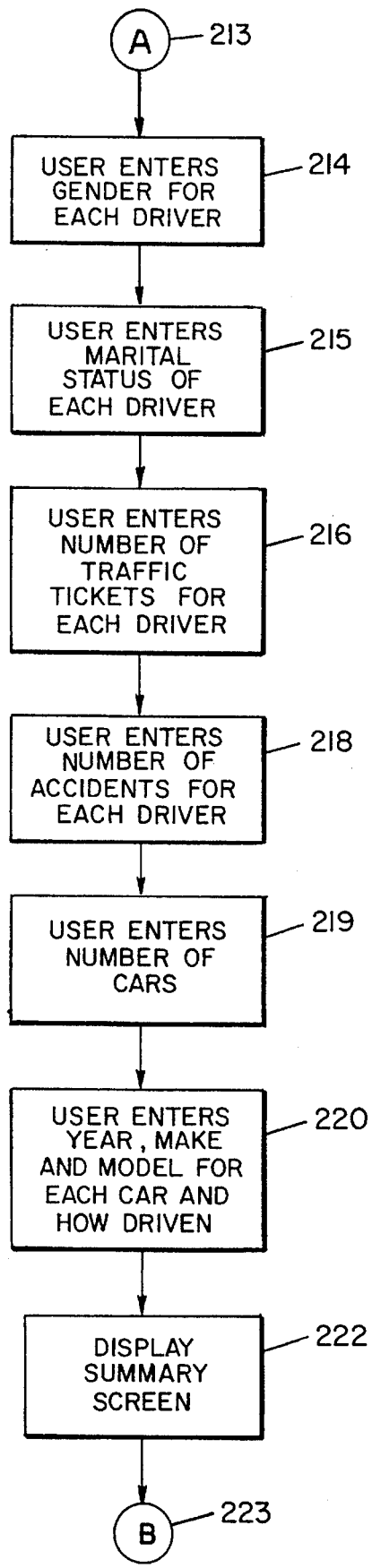
Figure 3C:
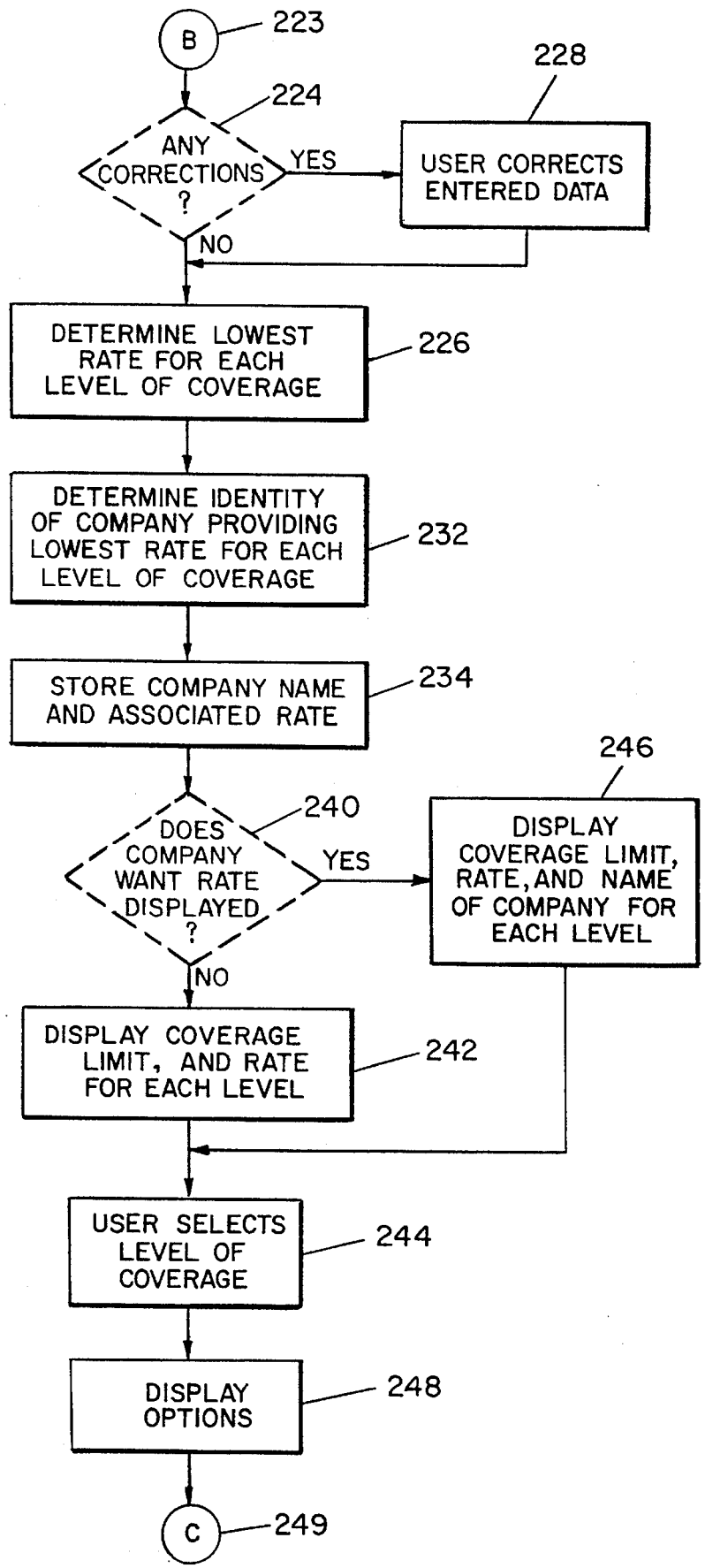
Figure 3D:
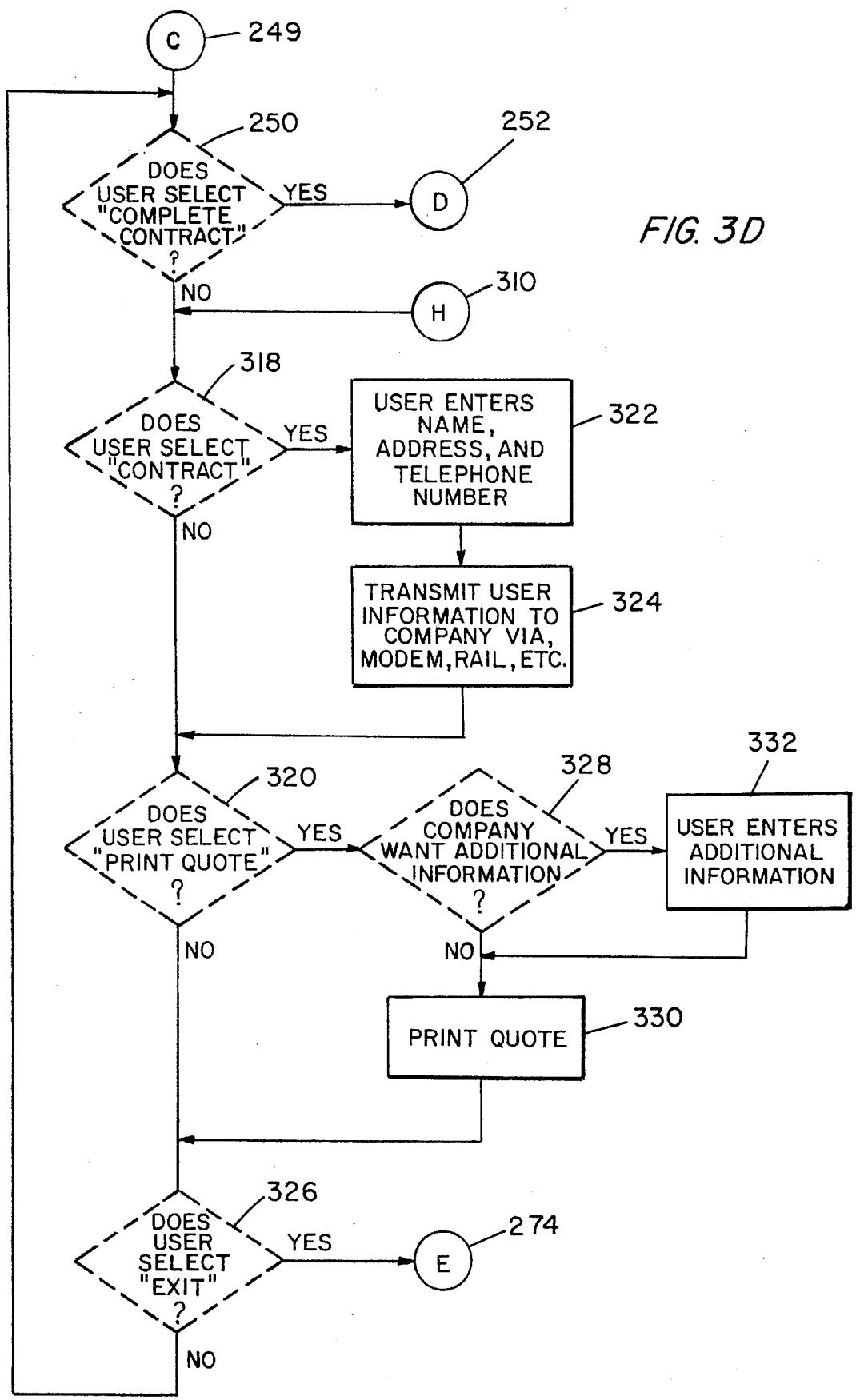
Figure 3E:
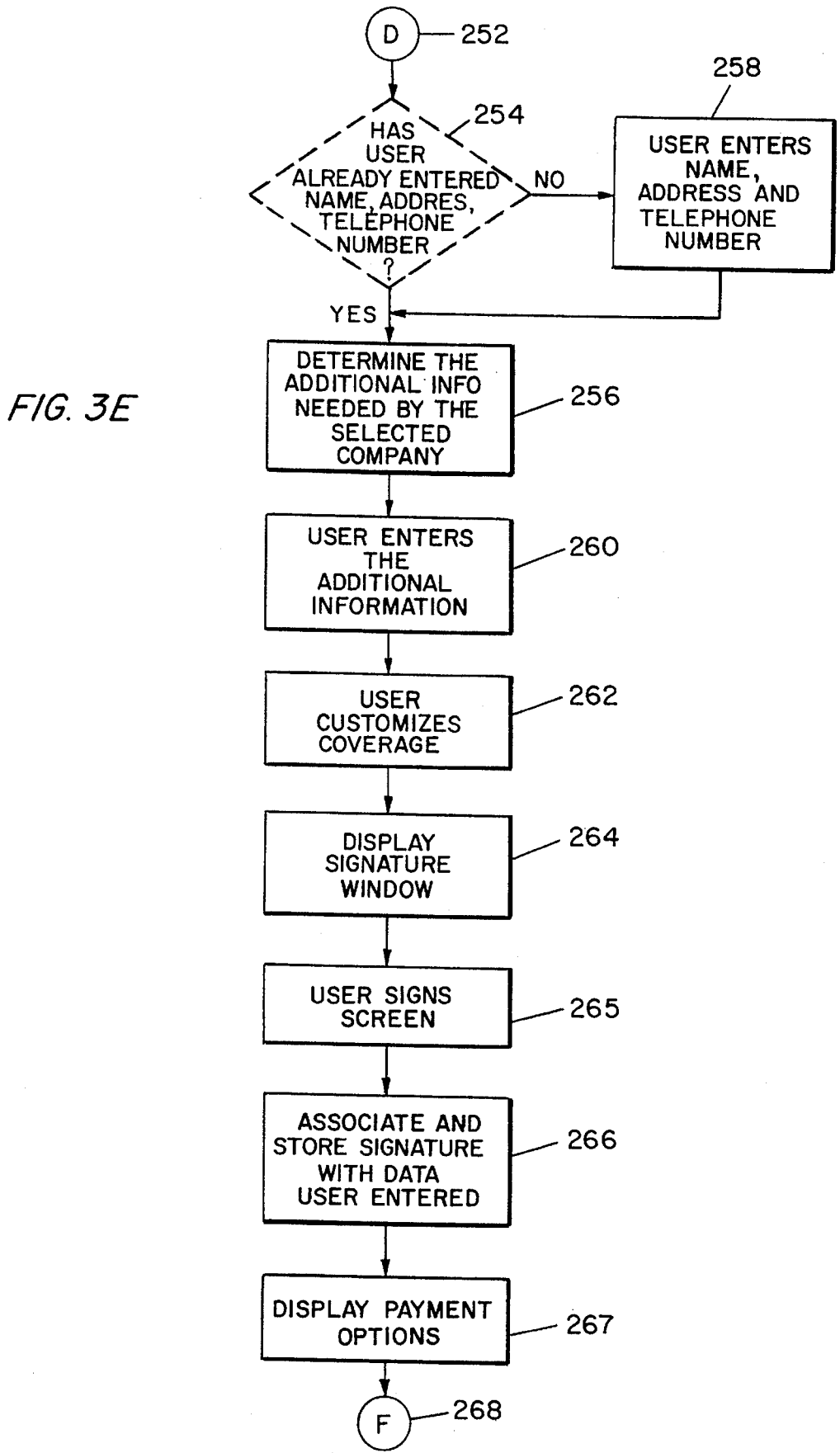
Figure 3F:
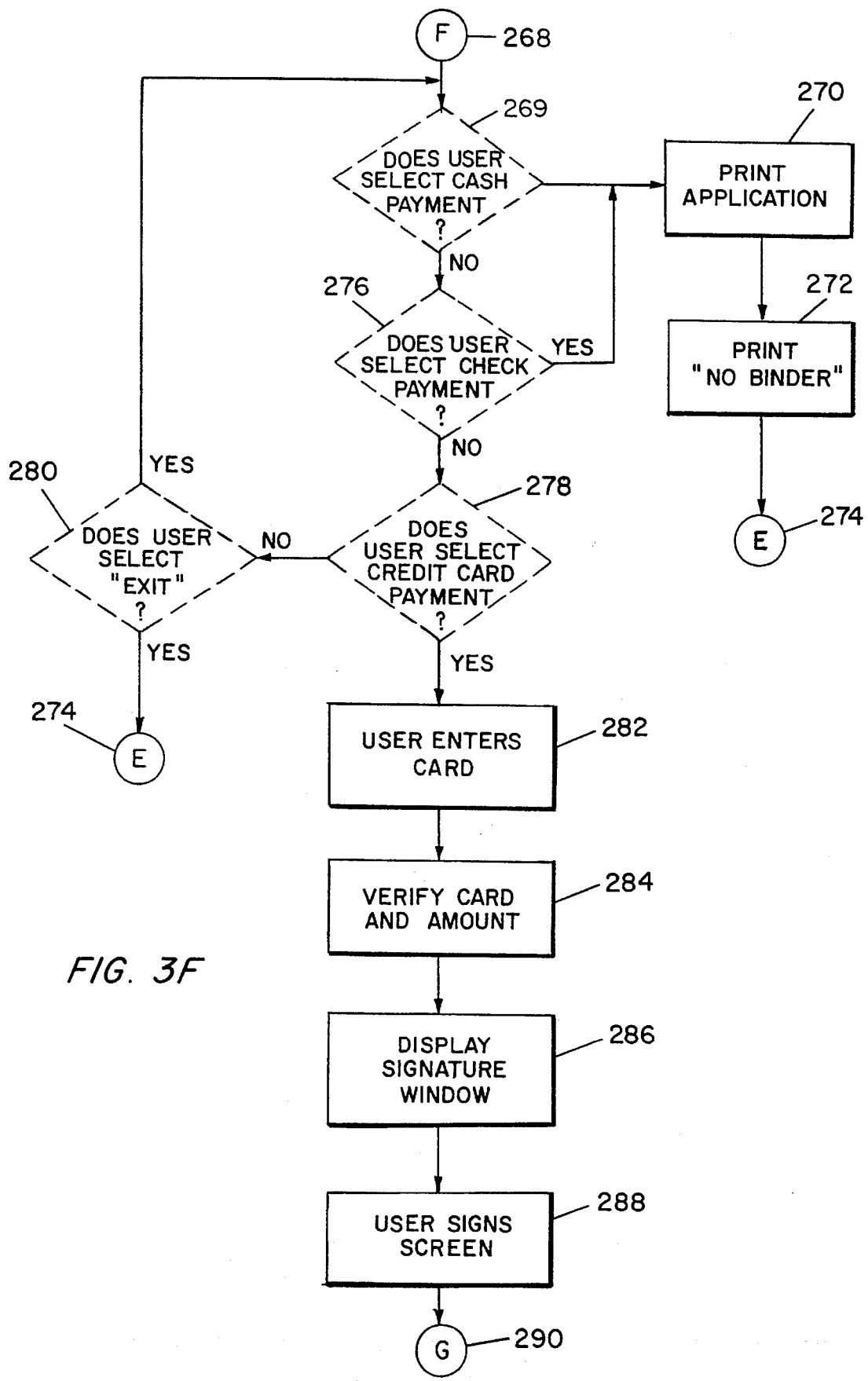
Figure 3G:
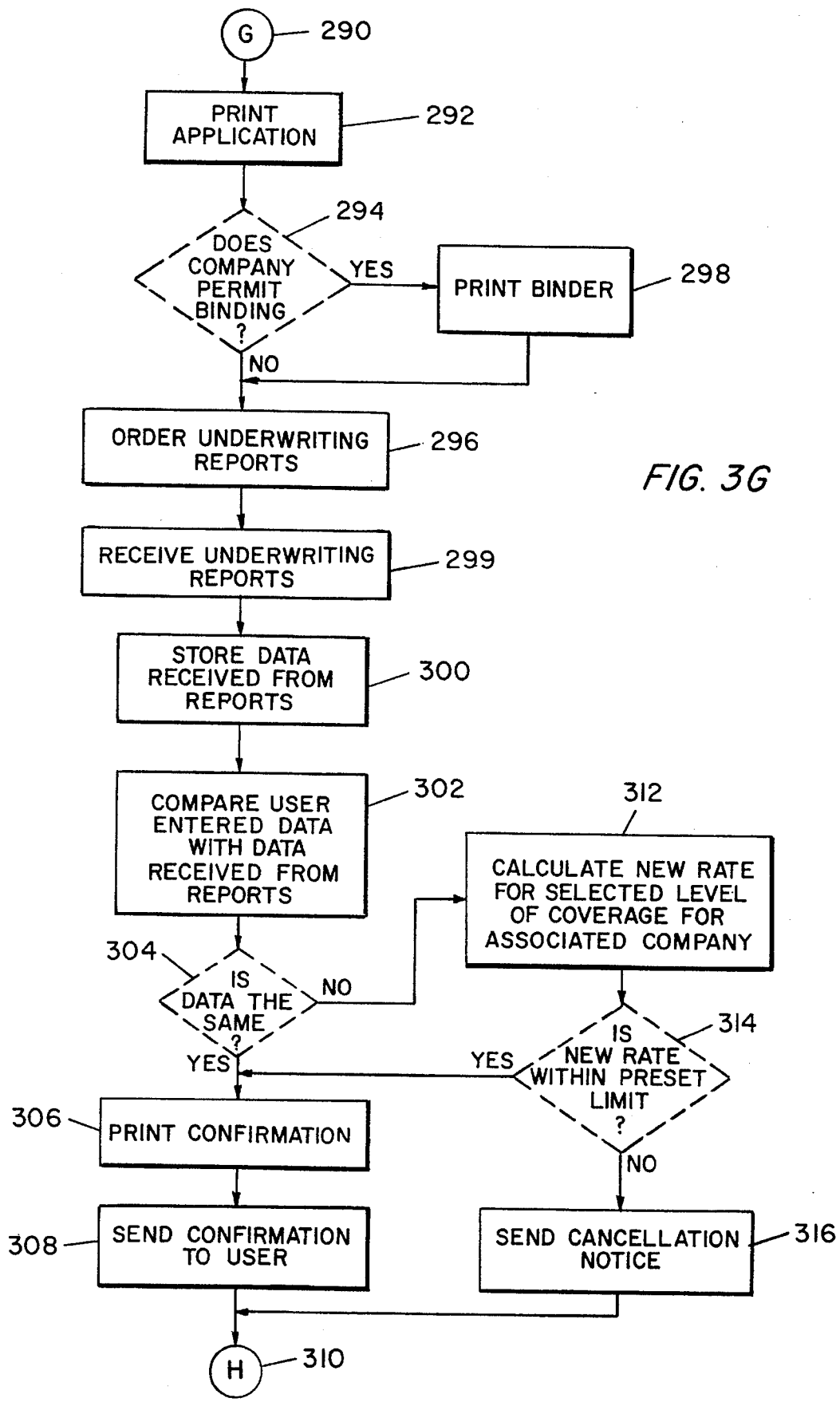

FIG. 2 is a high level flow chart which depicts the automatic association of a user's signature with a selected document in accordance with the present invention. The process starts as depicted at block 100 and thereafter passes to block 101 which illustrates the specification of a document. As described above, the document may be an insurance agreement created by the user, or any other type of document. Next, block 102 illustrates the displaying of a window 1400 (see FIG. 14) on touchscreen 16. Thereafter, the process passes to block 104 which depicts the signing of touchscreen 16 by a user utilizing pointing device 18.

Next the process passes to block 106 which illustrates a determination of whether or not the user activated at least one pixel within touchscreen 16 by touching at least one position on touchscreen 16 with pointing device 18. If a determination is made that the user did not activate at least one pixel, the process passes again to block 106 and continues to loop there until the user activates at least one pixel.

Referring again to block 106, if a determination is made that the user activated at least one pixel, the process passes to block 108 which illustrates a determination of whether or not the user activated a pixel outside window 1400. If a determination is made that the user did activate a pixel outside window 1400, the process passes to block 110 which depicts the sounding of a beep. Next, the process passes again to block 106.

Referring again to block 10S, if the determination is made that the user did not activate a pixel outside window 1400, the process passes to block 112 which illustrates a determination of only the pixels which have been activated. The process then passes to block 114 which illustrates storing only those pixels that have been activated. Thereafter, the process passes to block 115 which depicts the association of the specified document with the stored pixels. The process then terminates as illustrated at block 116.

FIGS. 3A–3G together form a high level flow chart which depicts the automatic creation of a binding insurance agreement within the data processing system of FIG. 1 in accordance with the present invention. The process starts as illustrated at block 200 and thereafter passes to block 202 which illustrates the displaying of an introductory screen 400 see FIG. 4. Next the process passes to block 204 which depicts the user selecting a language such as English or Spanish to use during operation of the program.

Thereafter, the process passes to block 206 which depicts the user selecting the start of the program by touching a "Start" block 402 on screen 400. Next the process passes to block 208 which illustrates the entering of a zip code by the user utilizing block 500 see FIG. 5. Next, the process passes to block 210 which illustrates the entering the number of drivers in the household by the user by utilizing block 502 see FIG. 5. Thereafter the process passes to block 212 which depicts the entering of the age of each driver by the user by utilizing block 602 see FIG. 6.

Next the process passes to block 214 as depicted through block 213. Block 214 depicts the entering of the gender of each driver by the user by utilizing block 604 see FIG. 6. Thereafter, the process passes to block 215 which illustrates the entering of the marital status of each driver by a user by utilizing block 606 see FIG. 6. The process then passes to block 216 which illustrates the entering of the number of traffic tickets for each driver by the user by utilizing block 700 see FIG. 7. The process then passes to block 218 which depicts the entering of the number of accidents for each driver by the user by utilizing block 800 see FIG. 8.

Figure 9:
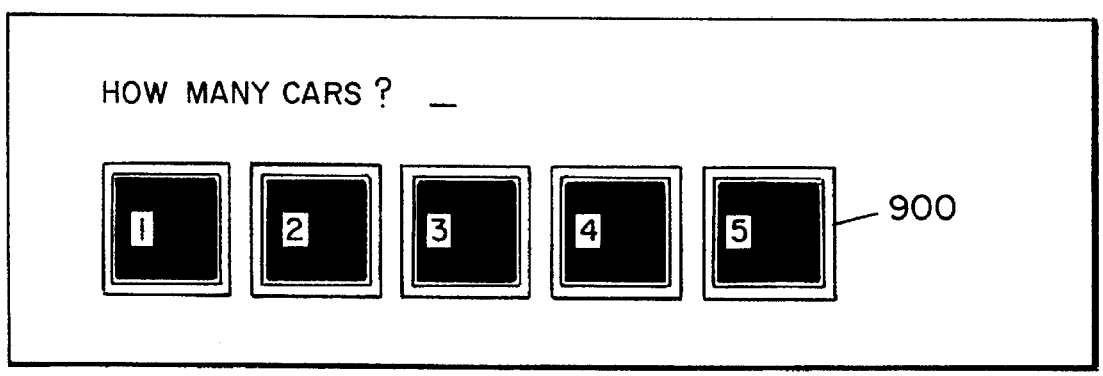
Figure 10:
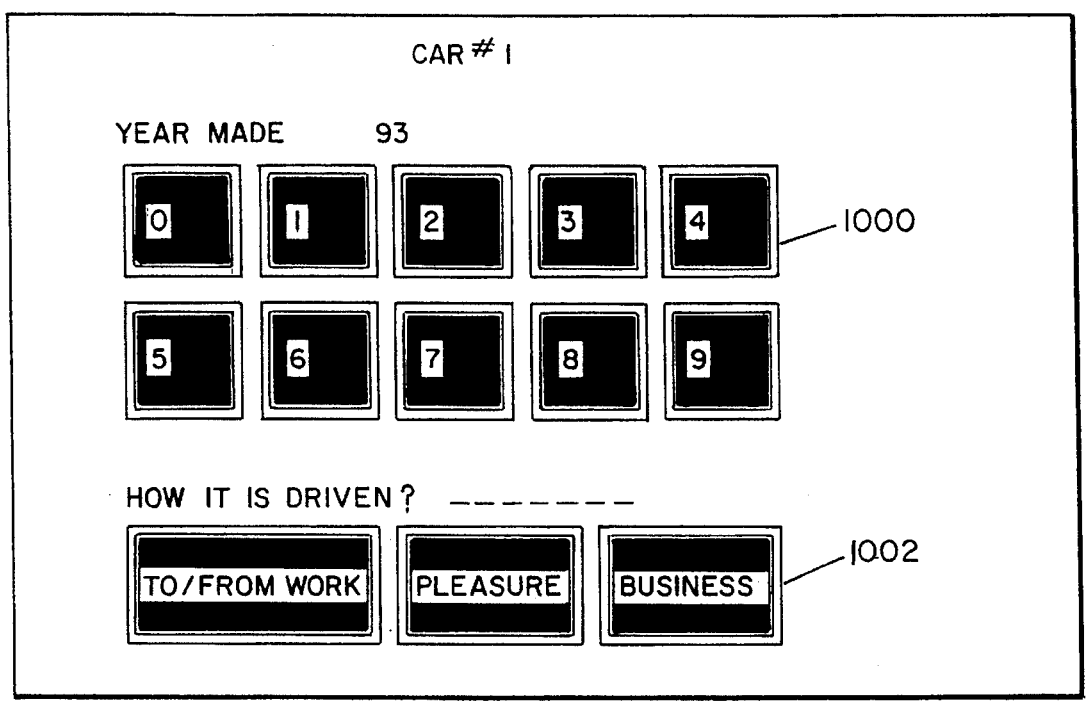

Thereafter, the process passes to block 219 which depicts the entering of the number of cars in the household by the user by utilizing block 900 see FIG. 9. The process then passes to block 220 which illustrates the entering of the year, make and model for each car in the household by the user by utilizing block 1000 see FIG. 10 and the entering of how the car is driven by utilizing block 1002 see FIGS. 10 and 11. Thereafter the process passes to block 222 which illustrates the displaying of a summary screen which includes all of the information the user has provided, including zip code, number of drivers in the household, age of each driver, marital status for each driver, number of traffic tickets and number of accidents for each driver, and the year, make and model for each car, and how each car is driven, see FIG. 12.

Next the process passes to block 224 as depicted through block 223. Block 224 illustrates a determination of whether or not the user wishes to make any corrections to the information entered. If the user does not wish to make corrections, the process passes to block 226. Those skilled in the art will recognize that any number or type of questions may be asked of the user. Of course, the entry screens will vary to conform to the type of question asked.

Referring again to block 224, if a user does wish to make a correction, the process passes to block 228 which illustrates the correction of information by the user by utilizing block 1200 see FIG. 12. Thereafter, the process passes to block 226. Block 226 depicts a determination of the lowest rate for each level of coverage. Any number of levels of coverage may be provided. The parameters defining each level of coverage is preset, but may easily be altered. For example, the minimum level of coverage may include only those levels required by a particular state. Other levels of coverage may include higher levels of liability protection, or lower deductibles. The lowest rate for each level of coverage is determined utilizing the information input by the user.

The process then passes to block 232 which illustrates the determination of the identity of the company providing the lowest rate for each level of coverage. Next, the process passes to block 234 which illustrates the storage of the company name and the determined rate within data processing system 10. Next the process passes to block 240 which illustrates a determination of whether or not the company wants its name displayed on touchscreen 16. If a determination is made that the company does not want its name displayed, the process passes to block 242 which depicts the displaying of the coverage limit and rate for each level without displaying the company name, see FIG. 13. Next the process passes to block 244 which illustrates the selection by a user of the level of coverage the user desires. A user may select a level by touching touchscreen 16 with a pointing device at block 1302, 1304, 1306, or 1308, see FIG. 13.

Referring again to block 240 if a determination is made that the company does want its name displayed, the process passes to block 246 which depicts the displaying of the coverage limit, rate and company name for each level, see FIG. 13. Thereafter the process again passes to block 244 and then again to block 246. Next, the process passes to block 248 which illustrates the displaying of options. The options may include completing an application, having a representative of the company contact the user, printing a quote of the selected level of coverage, or exiting the program.

Thereafter the process passes to block 250 as illustrated through block 249. Block 250 depicts a determination of whether or not the user selects the "complete contract" option. If a determination is made that the user has selected the "complete contract" option, the process passes to block 254 as illustrated through block 252. Block 254 illustrates the determination of whether or not a user has already entered his or her name, address, and telephone number. If the user has entered this information, the process passes to block 256. Referring again to block 254, if a user has not already entered name, address, and telephone number, the process passes to block 258 which illustrates the entering of name, address and telephone number by the user.

The process passes again to block 256 which depicts the determination of any additional information needed by the selected company. This additional information may include value of the cars, social security number, or any additional information that a company requests. Next the process passes to block 260 which illustrates the entering of the additional information by the user. Thereafter the process passes to block 262 which depicts the customization of coverage by the user. For example, a user may choose to waive personal injury protection. Next the process passes to block 264 which depicts the displaying of window 1400. Thereafter the process passes to block 265 which illustrates the signing of touchscreen 16 by the user utilizing pointing device 18. The receipt and storage of a user's signature is accomplished as described above in FIG. 2. Thereafter, the process passes to block 266 which depicts the association of the signature with the selected level of coverage, rate, and selected company, and the storage of this information within data storage system 26. Those skilled in the art will recognize that this information may be stored at any data processing system linked to data processing system 10, such as data processing systems 30 or 34.

Next the process passes to block 267 which illustrates the displaying of payment options. The process then passes to block 269 as illustrated through block 268. Block 269 depicts a determination of whether or not the user has selected the "cash payment" option. If a determination is made the user has selected the "cash payment" option, the process passes to block 270 which illustrates the printing of an application which incorporates all of the information supplied by the user, as well as the selected level of coverage, rate for the particular user at the selected level, and associated company.

Next the process passes to block 272 which illustrates the printing of an indication that no binder has been included. Thereafter the process passes again to block 202 as depicted through block 274. Referring again to block 269, if a determination is made that the user has not selected the "cash payment" option, the process passes to block 276 which illustrates a determination of whether or not the user has selected the "check payment" option. If a determination is made that the user has selected the "check payment" option, the process again passes to block 270.

Referring again to block 276, if a determination is made that the user has not selected the "check payment" option, the process passes to block 278 which illustrates a determination of whether or not the user has selected a "credit card payment" option. If a determination is made that the user has not selected the "credit card payment" option, the process passes to block 280 which illustrates a determination of whether or not the user has selected to exit the program. If the determination is made that the user has selected to exit the program, the process again passes to block 269. Referring again to block 280, if a determination is made that the user has not selected to exit the program, the process again passes to block 202 as depicted though block 274.

Referring again to block 278, if a determination is made that the user has selected the "credit card payment" option, the process passes to block 282 which illustrates the entering of a credit card by the user into credit card entry system 24. Next the process passes to block 284 which depicts the verification of the credit card and the amount to be charged as known in the art. Next the process passes to block 286 which illustrates the displaying of window 1400 in accordance with the present invention on touchscreen 16. Next the process passes to block 288 which illustrates the signing of touchscreen 16 by the user by touching pointing device 18 to touchscreen 16. Again, the receipt and storage of the user's signature is accomplished as described above in FIG. 2.

Thereafter the process passes to block 292 as illustrated through block 290. Block 292 depicts the printing of a completed application including the user's signature. Next the process passes to block 294 which illustrates a determination of whether or not the selected company permits binding. When the company permits binding, the user is immediately insured. If a determination is made that the selected company does not permit binding, the process passes to block 296. Referring again to block 294, if a determination is made that the selected company does permit binding, the process passes to block 298 which illustrates the printing of a binder.

Thereafter, the process passes again to block 296 which illustrates the ordering of underwriting reports such as driving history, claims history, and additional drivers registered at the identified address. These reports may be ordered by transmitting an order utilizing modem 22 and link 32 to another data processing system such as data processing system 36 operated by the department of motor vehicles. In this manner, the necessary reports may be ordered immediately, and received by data processing system 10. Next the process passes to block 299 which illustrates the receipt of those underwriting reports by data processing system 10.

Thereafter the process passes to block 300 which illustrates the storage of the information received within the reports. Next, the process passes to block 302 which depicts the comparison of the information entered by the user with the information received from the reports. Thereafter, block 304 illustrates a determination of whether or not the information is the same. If a determination is made that the information is the same, the process passes to block 306 which illustrates the printing of a confirmation of coverage. Thereafter the process passes to block 308 which illustrates the sending of the confirmation to the user. The process then passes to block 318 as illustrated through block 310.

Referring again to block 304 if a determination is made that the information is not the same, the process passes to block 312 which illustrates the calculation of a new rate for the selected level of coverage for the associated company, by utilizing the information received from the reports. Thereafter the process passes to block 314 which illustrates a determination of whether or not the new rate is within the limit pre-set by the associated company. If a determination is made that the new rate is not within the pre-set limit, the process passes to block 316 which depicts the sending of a confirmation notice. The process then again passes to block 318 as depicted through block 310. Referring again to block 314, if a determination is made that the new rate is within the pre-set limit, the process again passes to block 306.

Block 318 illustrates a determination of whether or not the user has selected the "contact" option. If a determination is made that the user has not selected the "contact option" the process passes to block 320. Referring again to block 318 if a determination is made that the user has selected the "contact option", the process passes to block 322 which depicts the entering of the user's name, address and telephone number by the user. Thereafter the process passes to block 324 which illustrates the transmission of the user's permission to contact the user to the selected company via modem 22, United States Postal Service, or any other acceptable means. Thereafter the process again passes to block 320.

Block 320 illustrates a determination of whether or not the user has selected the "print quote" option. If a determination is made that the user has not selected the "print quote" option, the process passes to block 326. Referring again to block 320, if a determination is made that the user has selected the "print quote" option, the process passes to block 328 which illustrates a determination of whether or not the selected company requires additional information. If a determination is made that the company does not require additional information, the process passes to block 330 which illustrates the printing of a quote.

Referring again to block 328, if a determination is made that the selected company requires additional information, the process passes to block 332 which illustrates the entering of the additional information by the user. Thereafter the process again passes to block 330, which illustrates the printing of a quote.

Next, the process passes to block 326 which illustrates a determination of whether or not a user has selected to exit the program. If the determination is made that the user has not selected to exit the program, the process passes again to block 250. Referring again to block 326, if a determination is made that the user has selected to exit the program, the process passes again to block 202 as illustrated to block 274.

FIG. 14A is a pictorial representation of a computer display screen depicting a signature window 1400 in accordance with the present invention. As described above, when a user's signature is required for association with a document such as a contract or insurance agreement, the user is prompted to "sign" touchscreen 16 within window 1400.

FIG. 14B is a pictorial representation of a computer display screen depicting a portion of the total number of pixels within touchscreen 16 and a signature window 1400 in accordance with the present invention. As described above, a user must "sign" touchscreen 16 within 1400. As known in the prior art, touchscreen displays typically are divided into a number of pixels, such as pixel 1402 and pixel 1404.

In accordance with the present invention, if a user activates a pixel outside of window 1400 such as by touching pixel 1402, the process will not proceed. A user must activate a pixel within window 1400 such as by touching pixel 1404.

While the invention has been particularly shown and described with reference to a preferred embodiment, it will be understood by those skilled in the art that various changes in form and detail may be made therein without departing from the spirit and scope of the invention.

What is claimed is:

1. A method for enabling a user to purchase an insurance policy and an insurance binder from a kiosk having a data entry means comprising a touchscreen display, a computer means, a storage means, a local printer and a communications means connected to a remote data processing system, said method comprising the steps of:

(a) displaying on the touchscreen display in the kiosk an opening menu to the user;

(b) accepting personal information from the user via the touchscreen display;

(c) quoting a price to the user for the insurance policy, the price being determined by the computer means from a pricing structure stored in the storage means;

verifying the personal information provided by the user by means of the remote data processing system through the communication means and amending the price quoted to the user if the verified personal information from the remote data processing system disagrees with the personal information provided by the user;

(e) accepting payment for the insurance policy by entry of a credit card number from the user and a verifying signature, the verifying signature being entered by the user on the touchscreen display and associated with the insurance policy by the computer means; and (f) printing on the local printer at the kiosk an insurance binder for the user having the verifying signature.

2. The method of claim 1 wherein the insurance policy is an automobile insurance policy.

3. The method of claim 2, prior to step (c), further comprising the steps:

accepting driving record information from the user via the touchscreen display;

accepting information from the user regarding a vehicle to be insured under the automobile insurance policy via the touchscreen display.

4. The method of claim 1 wherein the step of accepting personal information from the user comprises:

(bi) accepting an age for the user in response to a first prompt via the touchscreen display;

(bii) accepting a zip code for the user in response to a second prompt via the touchscreen display; and (biii) accepting a marital status for the user via the touchscreen display.

5. The method of claim 1 further comprising the step of:

(g) storing the personal information provided by the user in the storage means in association with the insurance binder issued to the user.

6. The method of claim 1 further comprising the step of:

g) transmitting the insurance policy via the communication means to an underwriter.

7. The method of claim 1 wherein the insurance policy is a life insurance policy.

\* \* \* \* \*